July 2, 1968  E. PRETE, JR  3,390,436
RELEASABLE BELT RETAINER APPARATUS FOR SAFETY BELT BUCKLES
Filed Dec. 2, 1965
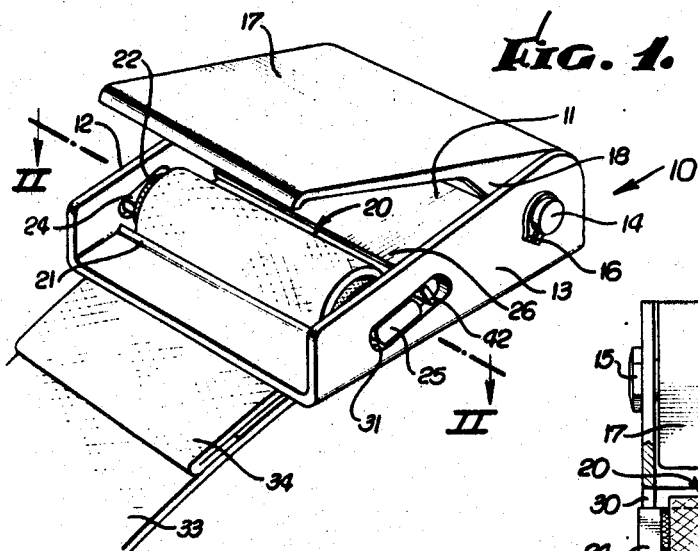
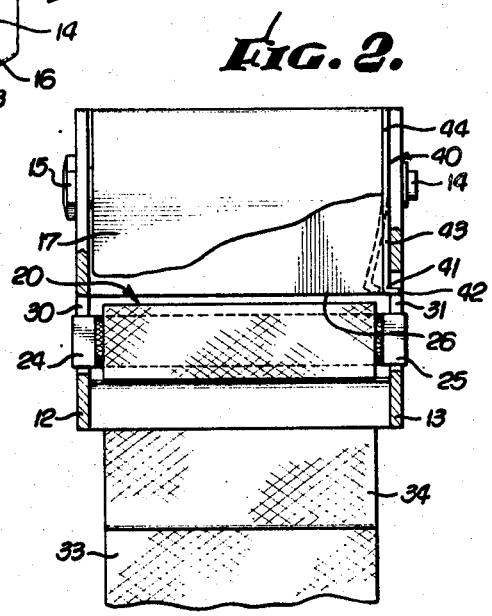
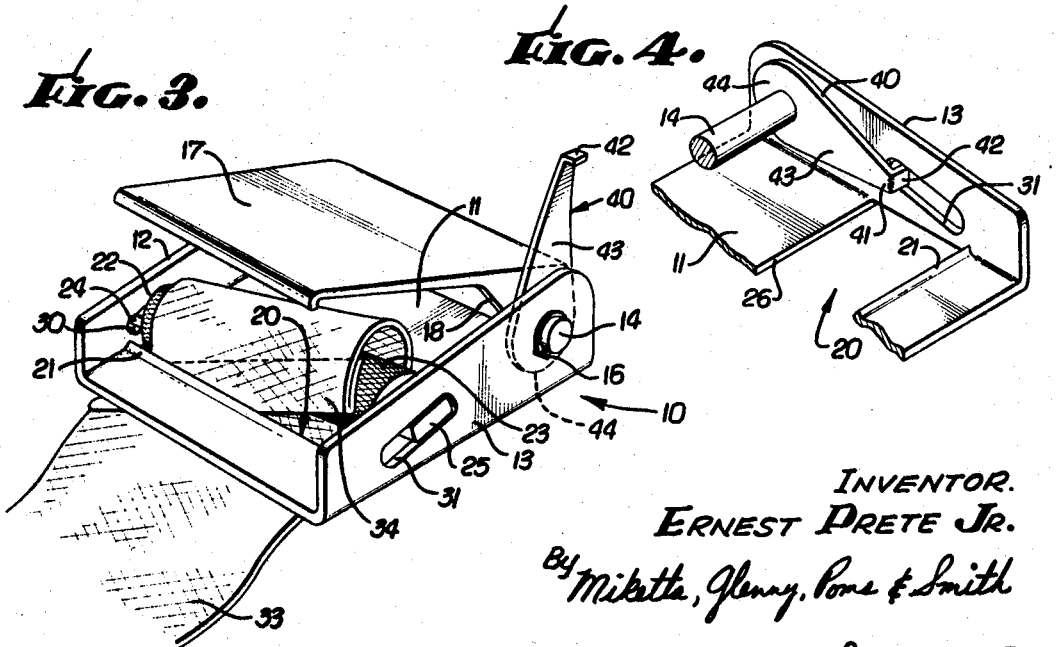
INVENTOR.
ERNEST PRETE JR.
By Mikulka, Glenny, Poms & Smith
ATTORNEYS.

United States Patent Office 3,390,436
Patented July 2, 1968

3,390,436
RELEASABLE BELT RETAINER APPARATUS
FOR SAFETY BELT BUCKLES
Ernest Prete, Jr., Woodland Hills, Calif., assignor to American Safety Equipment Corp., a corporation of California
Filed Dec. 2, 1965, Ser. No. 511,179
9 Claims. (Cl. 24—196)

ABSTRACT OF THE DISCLOSURE

A safety belt retaining apparatus for use with safety belt systems in which the belt is normally retained in the retaining apparatus during use but may be disengaged therefrom.

---

This invention relates in general to apparatus normally used in safety belts to adjustably retain one of the belt straps on the buckle base. More particularly, the present invention relates to the provision of means in such apparatus for allowing the removal of the buckle from the associated belt strap by releasing the belt from the belt retainer apparatus.

In most safety belt buckles presently in use, the buckle base mounts a knurled snubber bar above a belt aperture in the base about which one of the seat belt straps is wound. The belt or strap is passed through the aperture in the base, over the snubber bar and back down out through the belt aperture. The snubber bar is slidably mounted on the base so that a pull or loading on the belt causes the bar to slide toward a snubber wall, bind the belt or strap between the wall and bar and thus retain the belt or strap on the buckle base. When not under load, the strap allows the bar to slide freely so the strap may be adjusted about the bar to provide various desired strap lengths. This strap adjustment allows adjustment of the safety belt to fit about different size passengers.

The free end of the belt or strap retained upon the buckle base is generally doubled back upon itself and sewn to provide a thickened end portion. This thickened end portion serves to facilitate grasping the strap end, prevents unravelling of the woven strap and presents the loss or acidental removal of the buckle from the strap.

This last function of the belt or strap free end in preventing loss or removal of the buckle occurs because of the normal construction and relationship of the buckle base, snubber bar and belt aperture which prevent the passage of the thickened belt or strap end portion through the belt aperture past the small maximum opening permitted between the snubber bar and buckle base portions adjacent the belt aperture. While such construction and mode of operation of prior safety belt retention devices is desirable to prevent loss of the buckle, they are undesirable in installation of safety belts where it is desired to periodically release the buckle from its associated retained belt or strap. Such release may be required to allow replacement of the buckle or to allow cleaning of the belt or strap, without having to remove the entire belt assembly from the vehicle It is therefore the primary object of this invention to disclose and provide a safety belt retention apparatus for safety belt buckles which allows adjustment of the strap relative to the buckle but not its release during normal use and which can be easily manipulated when desired to allow complete release of the belt from the buckle to allow cleaning thereof or replacement of the buckle.

It is another object of this invention to disclose and provide a safety belt retention apparatus as in the foregoing object wherein a snubber bar means is normally limited to sliding movement not permitting release of the belt strap, but when it is desired to remove the buckle from the strap, the snubber bar means may be moved to a release position allowing release of the strap therefrom.

It is a further object of this invention to disclose and provide in a safety belt buckle apparatus including a base and snubber bar means, a provision of means for mounting the snubber bar on the base to allow movement thereof to various portions allowing: adjustment of the strap, snubbing of the strap against portions of the base and allowing passage of a thickened end portion of the safety belt strap between the base and bar means to release the strap therefrom; and limiting means conveniently and removably positioned to limit normal movement of the snubber bar means to positions other than that allowing passage of the end portion of the strap between the base and snubber bar means.

It is still further object of this invention to disclose and provide in a safety belt buckle having a base, a belt or strap receiving aperture and snubber bar means slidably mounted above the aperture, the provision of pivoted latch means for normally limiting the sliding movement of the snubber bar means to prevent the complete removal of the strap therefrom, the strap having a thickened end portion, and convenient mounting means for pivotally mounting the latch means for ease of movement into and out of a closed or limiting position in which it limits the sliding movement of the snubber bar.

These and further objects and advantages of the present invention will become apparent to those skilled in the art from a consideration of the following detailed explanation of an exemplary embodiment of the safety belt retention apparatus, according to the present invention. Reference will be made to the appended sheet of drawings in which:

FIG. 1 is a perspective view of an exemplary embodiment of the provision in a safety belt buckle, of a safety belt retention apparatus, according to the present invention, with a latch means thereof in closed or limiting position;

FIG. 2 is a plan view of the exemplary embodiment of FIG. 1 partially sectioned along the plane II—II therein;

FIG. 3 is a perspective view of the exemplary embodiment of safety belt retention apparatus of FIGS. 1 and 2 with a latch means thereof shown in an open non-limiting or release position; and FIG. 4 is a detail view of a portion of the exemplary embodiment of safety belt retention apparatus of FIGS. 1 through 3.

Referring first to FIGS. 1 and 2, the safety belt buckle, indicated generally at 10, includes a bottom plate-like base portion 11 with a pair of opposed upstanding sidewalls 12 and 13, respectively. Sidewalls 12 and 13 are preferably parallel to each other and integrally formed with the base 11 by conventional metal stamping and forming operations.

Adjacent the front end of the buckle base there is provided a spindle or pin 14 extending between the base sidewalls 12 and 13 generally parallel to and spaced above the base 11. Spindle or pin 14 has an enlarged hexagonal head 15 which fits into a similarly shaped recess in the sidewall 12, to prevent rotation of the pin relative to the sidewalls, and is held against withdrawal therefrom by a conventional snap ring 16 seated in a groove formed in the opposite end of pin 14.

Handle or coverplate 17 is pivotally mounted upon the spindle or pin 14 to pivotally overlie the buckle base 11 between the sidewalls 12 and 13.

The buckle base, sidewalls, handle and spindle thus far described are intended to be exemplary only of a type of safety belt buckle in which the safety belt retention apparatus of the present invention may be employed. The buckle may have an enlarged cam portion formed in the pivoted end of the buckle handle to frictionally engage a safety belt strap threaded between the buckle base and the enlarged end of the handle, or it may be provided with spring biased catch or dog means, now well known in the art, to provide a metal-to-metal connection with a metal tongue plate to be received between the buckle base and handle pin as 14. The handle 17 may also be spring biased into a closed position by conventional spring means. By way of example, the buckle base, handle pin, handle and dog or latching mechanism of U.S. Letters Patents Nos. 2,846,745 and 2,876,516 may be employed.

At a rearward portion of base 11, there is provided a wide transverse strap or belt aperture, indicated generally at 20, as best seen in FIGS. 2 and 4. An upstanding snubber wall 21 may be provided along the rear edge of the strap or belt aperture to be used in snubbing or holding the safety belt strap or belt to the buckle in adjusted positions, as hereinafter explained. This transverse upwardly extending snubber wall 21 may be formed as a continuation of the base 11.

Snubber bar means are provided on the buckle base in a region above the strap or belt aperture, indicated generally at 22. The snubber bar means adjustably hold the safety belt or strap passed through the belt aperture and entrained about it when the strap is placed under load. In the exemplary embodiment snubber bar 22 is preferably provided with a knurled or roughened surface on its body portion 23, as best seen in FIG. 3, and reduced and flattened end portions 24 and 25, respectively.

Means are provided for slidably mounting the snubber bar means transversely of the buckle base above the belt aperture, indicated generally at 20. In the exemplary embodiment, such means include a pair of opposed openings 30 and 31 provided in the buckle sidewalls 12 and 13, respectively. In the exemplary embodiment, these openings 30 and 31 are elongated and inclined to the buckle base, the rearward ends of the openings being closer to the buckle base than the forward ends. Flattened end portions 24 and 25 of snubber bar 22 are slidably received within the openings 30 and 31, respectively, to mount the snubber bar transversely of the buckle base between the sidewalls 12 and 13 directly above the belt aperture, indicated generally at 20. The snubber bar 22 is thus mounted to slide rearwardly and downwardly toward the snubber wall 21, to bind or snub the strap 33 therebetween, when strap 33 is placed under load.

Safety belt or strap 33 is entrained about snubber bar 22, as shown in FIG. 1, to be adjustably secured to the buckle base. The free end 34 of belt or strap 33 is generally folded over and sewn, as shown in FIG. 1, or provided with a metal or plastic end cover to prevent unravelling or wearing thereof due to handling by the seat belt user. In conventional prior buckles, this thickened end portion 34 has prevented the removcal of the belt strap after assembly to the buckle and installation thereof in the automobile or airplane.

Strap or belt 33 may be assembled to the buckle base by passing the end opposite the thickened end 34 upwardly through the belt aperture between the snubber wall 21 and the snubber bar 22. The strap is then passed over the top of bar 22 and downwardly through the belt aperture between bar 22 and the forward edge 26 of the belt aperture. Such opposite end is then assembled to floor fittings installed to the vehicle floor or wound within a seat belt retraction device.

In order to prevent loss or inadvertent disassembly of the belt buckle from the belt strap 33, the sliding movement of snubber bar 22 relative to the buckle base is normally limited to prevent the passing of the belt end thickened portion 34 between the snubber bar and base portion 21. However, in order to clean the strap or belt 33 without completely removing it from its floor mounted installation or retraction device, or for allowing replacement of the buckle, strap 33 may be completely released from the buckle as hereinafter described.

In accordance with the present invention, the mounting means for the snubber bar 22 allow movement to a strap release position but the bar is normally limited in its sliding movement by removable limiting means which prevent the release of the strap from the buckle. In the exemplary embodiment, the mounting means include the opposed side wall openings 30 and 31.

Opening 30, in the exemplary embodiment, is approximately as long as the width of the transverse belt aperture, indicated generally at 20. Sudden bar end 24 can thus slide only longitudinally of the buckle base approximately the same distance as the width of the belt aperture and does not move to a position allowing passage of the thickened portion 34 between base portion or wall 21 and the snubber bar body 23 adjacent the end 24. According to the present invention, at least one of the openings slidably mounting the snubber bar to the sidewalls 12 and 13 is sufficiently large to allow movement of the snubber bar 22 to a release position relative to base 11, wherein the belt free thickened end 34 may be passed between the bar and adjacent portions of the base. In the exemplary embodiment, the opening 31 is made larger longitudinally of the buckle base than opening 30 and the width of the belt aperture, indicated generally at 20.

When snubber bar end 25 is moved forwardly of the buckle base to the extreme forward end of openings 31, as shown in FIG. 3, the snubber bar 22 is placed in its strap release position. Such movement of bar end 25 forwardly in the larger opening 31 provides sufficient clearance between the snubber bar body 23 and the base portion or wall 21, adjacent end 25 as shown in FIG. 3, to allow passage of the thickened end portion 34 of belt strap 33 between snubber bar 22 and base 11 and the release therefrom of strap 33.

In order to prevent inadvertent movement of the snubber bar means to its aforedescribed release position, limiting means are provided to limit the sliding movement of the snubber bar to positions other than said release position. The limiting means however still allow adjustment of the strap 33 relative to the buckle base and the snubbing thereof between bar 22 and snubber wall or base portion 21. In the exemplary embodiment, such limiting means include a latch member 40 having a free end positioned to abut the snubber bar at the enlarged or longer opening 31 and thus limit its sliding movement therein.

Latch member 40 may be pivotally mounted upon the spindle or handle pin 14 adjacent the base sidewall 13, as in the exemplary embodiment, to allow pivotal movement between a closed or limiting position and an open release or non-limiting position. When in the closed or limiting position of FIGS. 2 and 4, the latch member 40 is positioned with its free end 41 at the opening 31 approximately above the leading edge 26 of the belt aperture. In this closed or limiting position, the free end 41 of latch member 40 limits the sliding movement of the bar end 25 within opening 31 to approximately the same extent as the opposite bare end 24 slides within the opening 30. The open or release position of latch member 40 is shown in FIG. 3 wherein the latch member is pivotally swung about pivot pin 14 to remove the free end 43 from adjacent the bar end 25 and opening 31 and thus not limit the sliding movement of bar end 25.

In order to facilitate the positioning of the latch member 40 in its closed position with end 41 at the opening 31 to abut bar end 25, a positioning means or dog portion 42 may be provided at the free end 41, extending therefrom generally at right angles to the latch member body 43, to be positioned within the opening 31. When dog portion 42 is received within the opening 31, the latch member 40 is restrained from pivotal movement to an open or released position due to the engagement of the dog 42 with the upper and lower edges of opening 31.

Means for positioning and holding the latch member 40 adjacent the sidewall 13 are provided to normally maintain the latch member body 43 close to the sidewall with the dog portion 42 within opening 31. In the exemplary embodiment, such means include the provision of the handle 17 upon the spindle or handle pin 14 as best seen in FIG. 2. The enlarged pivoted end 18 of handle 17, when mounted on the spindle or pin 14, prevents sideward movement of the latch member 40 on its pivot pin 14. Latch member 40 may be bent, as seen in FIG. 3, to bias the free end 41 and dog 42 toward opening 31.

When the latch member 40 is provided with a dog portion 42 received within the opening 31 and its enlarged pivoted end 44 is held adjacent the sidewall, as in the exemplary embodiment, the latch member body 43 is preferably made sufficiently resilient to allow bending or elastic yielding of the body 43 to permit withdrawal of the dog portion 42 from the opening 31. As shown in dotted line in FIG. 2, by such provision of a resilient latch member body, the free end 41 and dog portion 42 may be moved inwardly of the buckle body, as by use of a screwdriver or other convenient means, against the bias of the resilient body 43 to spring dog 42 out of opening 31, upwardly past the sidewall 13 above opening 31. Latch member 40 may be thus released and allowed to assume any convenient position, such as shown in FIG. 3, where it is out of the way of the operator who will then remove the belt 33 from the buckle as hereinabove described.

From the foregoing explanation of an exemplary embodiment of the safety belt retention apparatus for safety belt buckles, according to the present invention, it can be seen that the foregoing objects have been attained by the present invention. The safety belt strap is normally retained upon the buckle base about the snubber bar means, free to be adjusted to various length, but not free to be accidentally or inadvertently released completely or separated from the buckle. When it is desired to remove the buckle from its strap to replace the buckle or clean the strap, the limiting means including the exemplary latch member 40 may be easily moved to an open, non-limiting position by use of an ordinary screwdriver. After the replacement of the buckle or cleaning of the strap, the latch member is easily pivoted back into its closed or limiting position to prevent complete release of the reassembled buckle and safety belt strap.

Having thus described an exemplary embodiment of the safety belt retention apparatus of the present invention, it should be understood by those skilled in the art that the foregoing detailed explanation is exemplary only and various modifications, adaptations and variation of the within exemplary safety belt retention apparatus may be made within the scope of the present invention which is defined by the following claims.

I claim:

1. In a safety belt buckle including a base with a transverse belt aperture and opposed sidewalls, and snubber bar means slidably mounted on said buckle above said aperture to receive a belt, having an enlarged free end, entrained about said bar and through said aperture, said bar means adapted to slide and abut the edge of the aperture when a tension is applied to the belt, the provision of:
 elongated openings in said base sidewalls to receive end portions of said snubber bar, said openings allowing movement of said snubber bar to a release position relative to said base wherein said belt enlarged free end may be passed between said bar and base and thereby release from said buckle; and
 limiting means comprising a pivotally mounted latch member having a free end removably positioned at one of said openings and adjacent to one of said snubber bar end portions in spaced apart relation when tension is applied to said belt for limiting sliding movement of said snubber bar when no tension is applied to said belt.

2. The provision of claim 1 wherein said latch member includes an arm having a dog portion on the free end thereof, said arm including means for biasing said dog portion towards said sidewall, said dog portion being receivable within said one of said openings to prevent said bar from moving to said release position and said base and latch member arm being provided with means for pivotally mounting said latch member to pivot from a closed position adjacent said one opening with said dog portion received therein to an open position away from said one opening.

3. The provision of claim 1 wherein said one of said openings is larger longitudinally of said sidewalls than the other of said openings and said dog portion is receivable within the enlarged portion of said one of said openings.

4. The provision of claim 1 wherein said base sidewalls support a pivot pin and said limiting means comprises a latch member pivotally mounted on said pivot pin with a laterally extending dog portion to abut an end portion of said bar in said one of said openings.

5. In a safety belt retention apparatus comprising:
 a body having a base and a pair of opposed sidewalls, said sidewalls having openings therein;
 a snubber bar and means for slidably mounting said bar above said base between said sidewalls with end portions of said bar received in said openings; and
 a belt receiving aperture in the rearward end of said base to allow a belt to be entrained about said bar through said aperture, said belt having a thickened portion, the provision of:
 latch means including a pivotally mounted arm having a free end normally adjacent to but in spaced apart relation with the portion of the belt entrained over said bar for limiting the extent to rearward sliding movement of said bar within said openings to prevent the passing of said thickened portion between said bar and base and thus the removal of said belt from said apparatus; and
 means for mounting said latch means to allow movement of said arm to a release position where said bar movement is not limited by said arm and said belt may be removed from said apparatus by passing said thickened portion between said bar and base.

6. The provision of claim 5 wherein said means for mounting said latch means includes a pivot pin extending from at least one of said sidewalls upon which said arm is pivotally mounted.

7. The provision of claim 6 wherein:
 said latch means is pivotally mounted on said pine adjacent said one of said sidewalls;
 means are provided on said pin for holding the pivoted end of said latch means adjacent said one of said sidewalls; and
 said latch means includes a dog portion extending laterally outwardly of a free end of said latch member and a bent body portion to bias said dog portion toward said one of said sidewalls,
 said latch means being resilient to allow movement of said free end and dog portion laterally of the opening in said one of said sidewalls to selectively limit or release the movement of said bar in said opening with said pivoted end held adjacent said one of said sidewalls.

8. A safety belt retention apparatus comprising:
 a body having a base and a pair of opposed sidewalls, said sidewalls having openings therein;
 a snubber bar and means for slidably mounting said bar above said base between said sidewalls with end portions of said bar received in said openings;
 a belt receiving aperture in said base to allow a belt to be entrained about said bar through said aperture, said belt having a thickened portion;
 a snubber wall supported by said base adjacent the edge of said belt receiving aperture, so that tension applied to said belt will cause said snubber bar to slide within said opposed sidewall openings and abut said snubber wall to prevent movement of the belt relative to said snubber bar;

latch means for limiting the extent of sliding movement of said bar within said openings to prevent the passing of said thickened portion between said bar and base and thus the removal of said belt from said apparatus; and means for mounting said latch means to allow movement of said latch means to a release position where said bar movement is not limited by said latch means and said belt may be removed from said apparatus by passing said thickened portion between said bar and base.

9. In a safety belt buckle including a base having a strap-receiving aperture and opposed upstanding walls and a snubber bar means to adjustably retain a strap received through said aperture and about said bar means, the strap having a thickened end portion, the provision of:

mounting means including openings in said upstanding walls for receiving end portions of said snubber bar means and for allowing movement of said bar means to a release position wherein said belt thickened portion may be passed between said bar and base to allow release of said belt from said buckle; and a latch member including an arm adjacent one of said upstanding walls and having a dog portion receivable within one of said upstanding wall openings to abut the snubber bar means end portion therein so as to limit movement of said bar means to said release position, said latch member being movable to an inoperative position for allowing movement of said bar means to said release position.

References Cited

FOREIGN PATENTS 236,817   11/1964   Austria.

BOBBY R. GAY, *Primary Examiner.*

WILLIAM FELDMAN, *Examiner.*

E. SIMONSEN, *Assistant Examiner.*